(12) United States Patent
Mengerink et al.

(10) Patent No.: US 8,498,908 B2
(45) Date of Patent: *Jul. 30, 2013

(54) SYSTEMS AND METHODS FOR FACILITATING FINANCIAL TRANSACTIONS OVER A NETWORK

(71) Applicants: Matthew Mengerink, San Jose, CA (US); Upendra Mardikar, San Jose, CA (US); David Gausebeck, Mountain View, CA (US)

(72) Inventors: Matthew Mengerink, San Jose, CA (US); Upendra Mardikar, San Jose, CA (US); David Gausebeck, Mountain View, CA (US)

(73) Assignee: Ebay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/631,347

(22) Filed: Sep. 28, 2012

(65) Prior Publication Data

US 2013/0036030 A1    Feb. 7, 2013

Related U.S. Application Data

(63) Continuation of application No. 13/284,620, filed on Oct. 28, 2011, now Pat. No. 8,280,777, and a continuation of application No. 11/966,743, filed on Dec. 28, 2007, now Pat. No. 8,224,702.

(51) Int. Cl.
*G06Q 40/00*    (2012.01)

(52) U.S. Cl.
USPC .......................................................... 705/27.1

(58) Field of Classification Search
USPC .......................................................... 705/27.1
See application file for complete search history.

(56) References Cited

U.S. PATENT DOCUMENTS

| 6,101,482 | A | 8/2000 | DiAngelo et al. |
| 6,141,006 | A | 10/2000 | Knowlton et al. |
| 6,618,705 | B1 | 9/2003 | Wang et al. |
| 7,162,443 | B2 | 1/2007 | Shah |
| 7,188,081 | B1 | 3/2007 | Shah |
| 2004/0181482 | A1 | 9/2004 | Yap |
| 2006/0015459 | A1 | 1/2006 | Enenkiel |
| 2007/0192424 | A1 | 8/2007 | Minato |
| 2007/0244778 | A1 | 10/2007 | Bailard |
| 2007/0271160 | A1 | 11/2007 | Stone et al. |

*Primary Examiner* — Daniel Felten
*Assistant Examiner* — Clifford Madamba
(74) *Attorney, Agent, or Firm* — Haynes and Boone, LLP (57) ABSTRACT

Systems and methods for facilitating financial transactions over a network include a merchant device, a client device and a payment processing device. The merchant device is adapted to allow a merchant to provide items for purchase via the network. The client device is adapted to allow a user to access the merchant device via the network and view the items for purchase. The client device is adapted to provide a payment mechanism to the user. The user generates a purchase request for an item by selecting the one item, dragging the item to the payment mechanism, and dropping the item over the payment mechanism. The payment processing device is adapted to receive the purchase request from the client device via the network and authorize the user to purchase the item from the merchant based on information passed with the purchase request.

19 Claims, 8 Drawing Sheets

Drag-and-Drop Icon on Desktop

SYSTEMS AND METHODS FOR FACILITATING FINANCIAL TRANSACTIONS OVER A NETWORK

This patent application is a continuation of U.S. patent application Ser. No. 13/284,620, filed Oct. 28, 2011, and is a continuation of U.S. patent application Ser. No. 11/966,743, filed on Dec. 28, 2007, which was granted a U.S. Pat. No. 8,224,702, all of which are incorporated by reference in their entirety.

BACKGROUND

1. Field of the Invention

The present invention generally relates to financial transactions and more particularly to facilitating financial transactions over a network.

2. Related Art

In online financial transactions, customers search for and purchase products and services through electronic communications with online merchants over electronic networks, such as the Internet. During the course of these transactions, customers may provide payment in various ways including, for example, credit cards, electronic fund transfers, and other payment techniques offered by payment providers.

Typically, when online shopping at a particular website, customers select items to purchase by clicking on a link for a specific item. The selected items are placed on reserve in some type of virtual shopping cart. When done shopping, the customer proceeds to a checkout page to provide some form of payment for the selected items. At this point in the process, the customer provides some form of identification and payment. When the customer continues shopping and is ready to purchase items from another website, the customer is typically prompted to re-enter some form of identification and payment.

This process can be tedious and inconvenient. Entering information every time an online transaction takes place is inefficient and time consuming. Thus, there currently exists a need to improve the process of purchasing products and services in online transactions.

SUMMARY

In accordance with embodiments of the invention, systems and methods for facilitating financial transactions over a network include a merchant device, a client device and a payment processing device. The merchant device is adapted to allow a merchant to provide one or more items for purchase via the network. The client device includes a browser application adapted to allow a user to access the merchant device via the network and view the one or more items for purchase. The client device includes a service application adapted to provide a payment mechanism to the user. The user generates a purchase request for at least one item by selecting the at least one item, dragging the at least one item to the payment mechanism, and dropping the at least one item over the payment mechanism. The payment processing device is adapted to receive the purchase request from the client device via the network and authorize the user to purchase the at least one item from the merchant based on information passed with the purchase request.

In accordance with embodiments of the invention, the merchant device may be adapted to allow a merchant to generate a bill image summarizing the one or more items selected for purchase. The client device may be adapted to allow the user to generate a purchase request for at least one item by selecting the at least one item, instructing the merchant device to generate the bill image summarizing purchase of the at least one item selected for purchase, dragging the bill image to the payment mechanism, and dropping the bill image over the payment mechanism. The payment processing device is adapted to receive the purchase request, including information related to the bill image, from the client device via the network and authorize the user to purchase the at least one item from the merchant based on information passed with the purchase request.

In accordance with embodiments of the invention, systems and methods for facilitating financial transactions over a network include a first component adapted to communicate with a user via a client device over the network and a merchant via a merchant device over a network and a second component adapted to receive a purchase request from the user via the client device over the network and authorize the user to purchase at least one item from the merchant based on information passed with the purchase request. The second component provides a service application to the user as a payment mechanism, and the service application allows the user to generate the purchase request for the at least one item by selecting the at least one item from the merchant device, dragging the at least one item to the payment mechanism, and dropping the at least one item over the payment mechanism.

In accordance with embodiments of the invention, systems and methods for facilitating financial transactions over a network include receiving a purchase request for a selected item from a user via the network. The purchase request includes user information, merchant information, and selected item information embedded as arguments in an expression. The systems and methods include verifying the user information including accessing a user account based on the user information to verify the availability of monetary funds for the selected item and verifying the merchant information including accessing a merchant account based on the merchant information and availability of the selected item related to the selected item information. The systems and methods include processing the purchase request by authorizing the user to purchase the selected item from the merchant based on the verified user and merchant information and completing the purchase request by deducting monetary funds from the user account and crediting the deducted monetary funds to the merchant account.

These and other features and advantages of the present invention will be more readily apparent from the detailed description of the embodiments set forth below taken in conjunction with the accompanying drawings.

Embodiments of the invention and their advantages are best understood by referring to the detailed description that follows. It should be appreciated that like reference numerals are used to identify like elements illustrated in one or more of the figures, wherein showings therein are for purposes of illustrating embodiments of the invention and not for purposes of limiting the same.

DETAILED DESCRIPTION

Embodiments of the present disclosure enable users to drag-and-drop an image (e.g., icon) of an item (e.g., product or service for purchase) displayed in a graphical user interface (GUI), such as a web browser, to a payment mechanism, such as a desktop image or icon and/or a toolbar. When enabled, the payment mechanism recognizes the selected item and communicates with a payment processing provider to purchase the selected item. In one implementation, the payment processing provider may redirect the user to a page on a merchant site that confirms their purchase of the selected product. The payment mechanism may also take different actions, such as adding the product to a virtual shopping cart and providing buttons to complete the purchase at a later time. In various embodiments, the payment mechanism may be implemented with a browser plug-in, bundled with an existing toolbar or application, or a provided in a frames-based implementation that may not require the user to download an application.

In some implementations, the image on the web page representing an item for purchase may include an image attribute having dynamic arguments identifying the item for purchase as information in a bill or invoice. When enabled, the payment mechanism may transmit a bill or invoice identifier along with a user identifier and/or a merchant identifier to the payment processing provider for payment processing of the purchase. After payment processing is completed, the payment processing provider may inform the merchant of the processing result, which may include a successful payment. In another implementation, the bill or invoice image may be dragged by the user to any of a plurality of payment provider images or icons (e.g., Visa, MC, AmEx, PayPal). Therefore, it should be appreciated that various embodiments of the present disclosure may extend beyond a browser application to other applications that enable dragging-and-dropping of objects, while retaining information associated with the objects.

Embodiments of the present disclosure overcome deficiencies of conventional approaches to processing online financial transactions, wherein the merchant manages a cash register and/or point-of-sale (POS) device and receives credit card information from a client or user. Instead, embodiments of the present disclosure enable a merchant to manage the cash register (e.g., a user's shopping cart) and the payment processing provider manages the POS device and the user's credit card and/or banking information. Thus, the merchant transmits bill or invoice information to the payment processing provider, which handles the payment processing and reports back results thereof, such as success or failure, thereby simplifying the merchant's involvement with the payment transaction.

Figure 1:
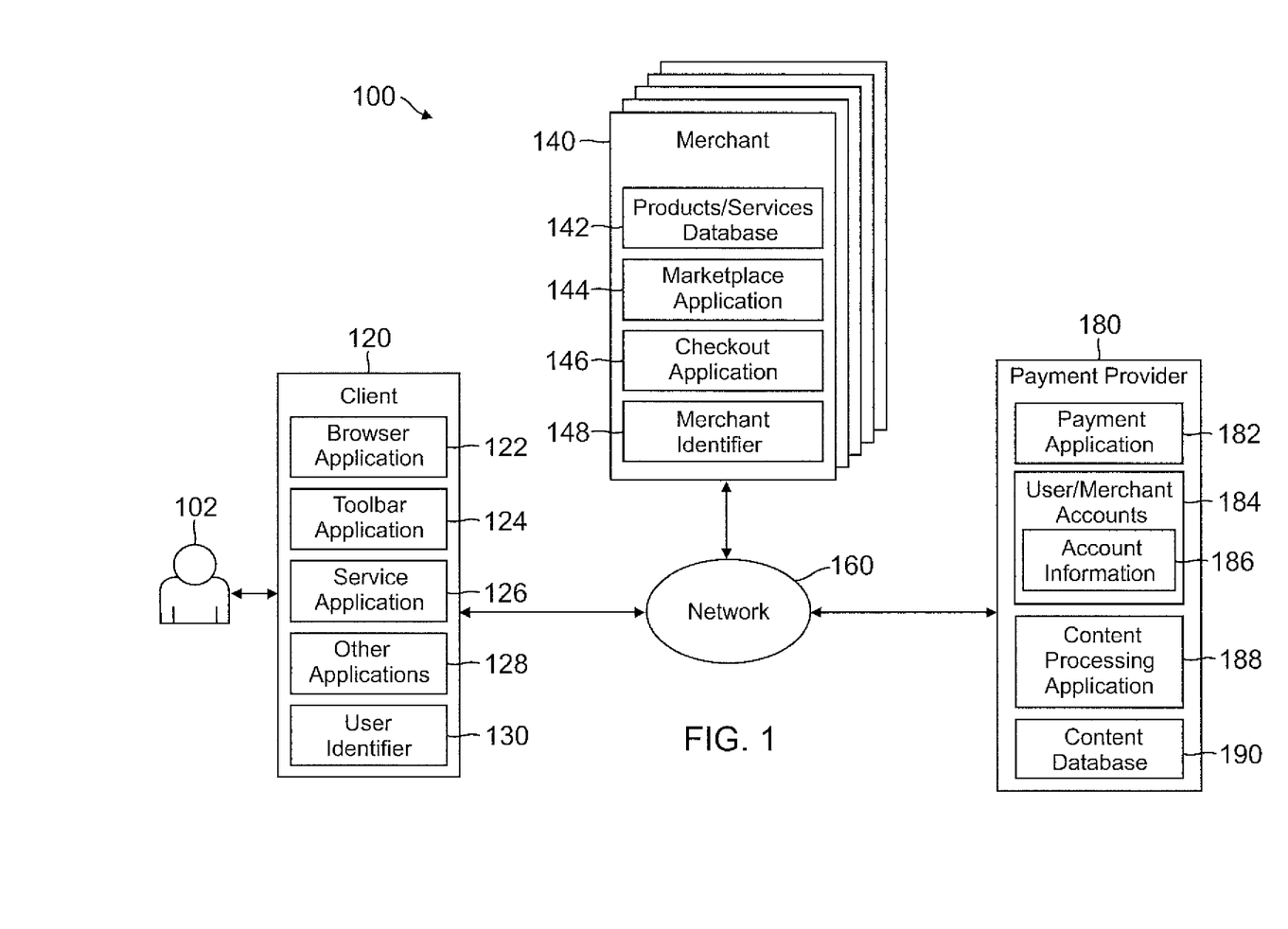
FIG. 1 shows a block diagram of a networked system configured to facilitate online transactions in accordance with an embodiment of the invention.

FIG. 1 shows one embodiment of a block diagram of a system 100 configured to facilitate financial transactions over a network 160. As shown in FIG. 1, system 100 includes at least one client device 120, one or more merchant servers 140, and at least one payment provider server 180 in communication over the network 160.

In one embodiment, the network 160 may be implemented as a single network or a combination of multiple networks. For example, in various embodiments, the network 160 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

In one embodiment, the client device 120 may be implemented using any appropriate combination of hardware and/or software configured for wired and/or wireless communication over the network 160. For example, the client device 120 may be implemented as a personal computer of a user 102 (e.g., a client or customer) in communication with the network 160, such as the Internet. In other examples, the client device 120 may be implemented as a wireless telephone (e.g., cell phone), personal digital assistant (PDA), notebook computer, and/or various other generally known types of computing devices.

In one embodiment, the client device 120 may include one or more browser applications 122 which may be used, for example, to provide a user interface to permit the user 102 to browse information available over the network 160. For example, the browser application 122 may be implemented as a web browser to view information available over the Internet.

In one embodiment, the client device 120 may include one or more toolbar applications 124, which may be used, for example, to provide client-side processing for performing tasks in response to operations selected by the user 102. For example, the toolbar application 124 may display a graphical user interface (GUI) in connection with the browser application 122.

In one embodiment, the client device 120 may include a service application 126 for facilitating financial transactions on the network 160, including drag-and-drop shopping, which is discussed in greater detail herein. In one implementation, the service application 126 comprises a software program, such as a graphical user interface (GUI), executable by a processor that is configured to interface and communicate with the one or more merchant servers 140 and the payment provider server 180 via the network 160. The user 102 is able to access merchant websites via merchant servers 140 to view and select items for purchase, and the user 102 is able to purchase selected items from merchants 140 by communicating with the payment provider server 180.

When installed and executed by the client device 120, the service application 126 is configured to provide and display a payment mechanism, such as an image or icon, on a display component (e.g., monitor) of the client device 120. In general, an icon is a pictorial image used in a graphical user interface (GUI) to represent a program, application, command, link to a web page, etc., wherein the user 102 may select an object or action by clicking on a related icon with a cursor control component (e.g., mouse). In one embodiment, upon installation of the service application 126, the user 102 may be prompted to establish a user account with the payment provider server 180, wherein the user 102 may use the client device 120 to access the payment provider server 180 via the network 160. When establishing a user account, the user 102 may be asked to provide personal information, such as name, address, phone number, etc., and financial information, such as banking information, credit card information, etc.

In one embodiment, the client device 120 may include other applications 128 as may be desired in particular embodiments to provide additional features available to the user 102. For example, such other applications 128 may include security applications for implementing client-side security features, programmatic client applications for interfacing with appropriate application programming interfaces (APIs) over the network 160 or various other types of generally known programs and/or applications.

In one embodiment, the client device 120 may include one or more user identifiers 130, which may be implemented, for example, as operating system registry entries, cookies associated with the browser application 122, identifiers associated with hardware of the client device 120, or various other appropriate identifiers. The user identifier 130 may include attributes related to the user, such as personal information (e.g., a user name, password, photograph image, biometric id, address, phone number, etc.) and banking information (e.g., banking institution, credit card issuer, user account numbers, security information, etc.). In various implementations, the user identifier 130 may be passed with a user purchase request to the payment provider server 180, and the user identifier 130 may be used by the payment provider server 180 to associate the user 102 with a particular user account maintained by the payment provider server 180, in a manner as described herein.

In one embodiment, the one or more merchant servers 140 may be maintained, for example, by one or more merchants offering various items, such as products and/or services, in exchange for financial payment to be received from users, such as the user 102, over the network 160. In this regard, each of the one or more merchant servers 140 may include a database 142 for identifying available products and/or services, which may be made available to the client device 120 for viewing and purchase by the user 102. Accordingly, each of the merchant servers 140 may include a marketplace application 144, which may be configured to provide information over the network 160 to the browser application 122 of the client device 120. For example, the user 102 may interact with the marketplace application 144 through the browser application 122 over the network 160 to search and view various items, products and/or services identified in the database 142.

In one embodiment, each of the one or more merchant servers 140 may include a checkout application 146, which may be configured to facilitate online purchase transactions by the user 102 of products and/or services identified by the marketplace application 144. In this regard, the checkout application 146 may be configured to accept payment information from the user 102 and/or from payment provider server 180 over the network 160.

In one embodiment, each of the one or more merchant servers 140 may include one or more merchant identifiers 148, which may be included as part of the one or more items made available for purchase so that particular items are associated with particular merchants. The merchant identifier 148 may include attributes related to the merchant, such as business and banking information. In various implementations, the merchant identifier 148 may be passed with a user purchase request to the payment provider server 180 when the user 102 selects an item for purchase, and the merchant identifier 148 may be used by the payment provider server 180 to associate a particular item purchased with a particular merchant account maintained by the payment provider server 180, in a manner as described herein.

In one embodiment, each of the one or more merchants having a related merchant server 140 may need to establish a merchant account with the payment provider server 180 so that the payment server provider 180 is able to process transactions having items offered for purchase by the merchants. When establishing a merchant account, each of the one or more merchants may need to provide business information, such as name, address, phone number, etc., and financial information, such as banking information, merchant account information, credit card information, payment processing information, etc.

In various embodiments, as discussed herein, each of merchant servers 140 may be associated with a particular link (e.g., a link, such as a URL (Uniform Resource Locator) to an IP (Internet Protocol) address). In this regard, the payment provider server 180 may optionally redirect the browser application 122 to an appropriate webpage and/or merchant site of the merchant server 140 to facilitate purchase of a corresponding item and/or service available from at least one of the merchant servers 140.

In one embodiment, the payment provider server 180 may be maintained, for example, by an online payment service provider, which may provide payment processing for online transactions on behalf of the user 102 to an operator of the merchant server 140. In this regard, the payment provider server 180 includes one or more payment applications 182, which may be configured to interact with the client device 120 and/or each of the merchant servers 140 over the network 160 to facilitate the purchase of items, products and/or services by the user 102 from the merchant server 140. In one example, the payment provider server 180 may be provided by PayPal, Inc. of San Jose, Calif., USA.

In one embodiment, the payment provider server 180 may be configured to maintain a plurality of user and merchant accounts 184, each of which may include account information 186 associated with individual users, including the user 102, and the one or more merchants associated with the merchant servers 140. For example, account information 186 may include private financial information of user 102 and merchants 140, such as one or more account numbers, passwords, credit card information, banking information, or other types of financial information, which may be used to facilitate online transactions between the user 102 of the client device 120 and one or more merchants associated with the merchant servers 140. As such, the payment application 182 may be configured to interact with the one or more merchant servers 140 on behalf of the user 102 during a transaction with checkout application 146 without requiring the user 102 to provide account information 186 directly to the merchant server 180. In various embodiments, the methods and systems described herein may be modified to accommodate users and/or merchants that may or may not be associated with at least one existing user account and/or merchant account, respectively.

Figure 2A:
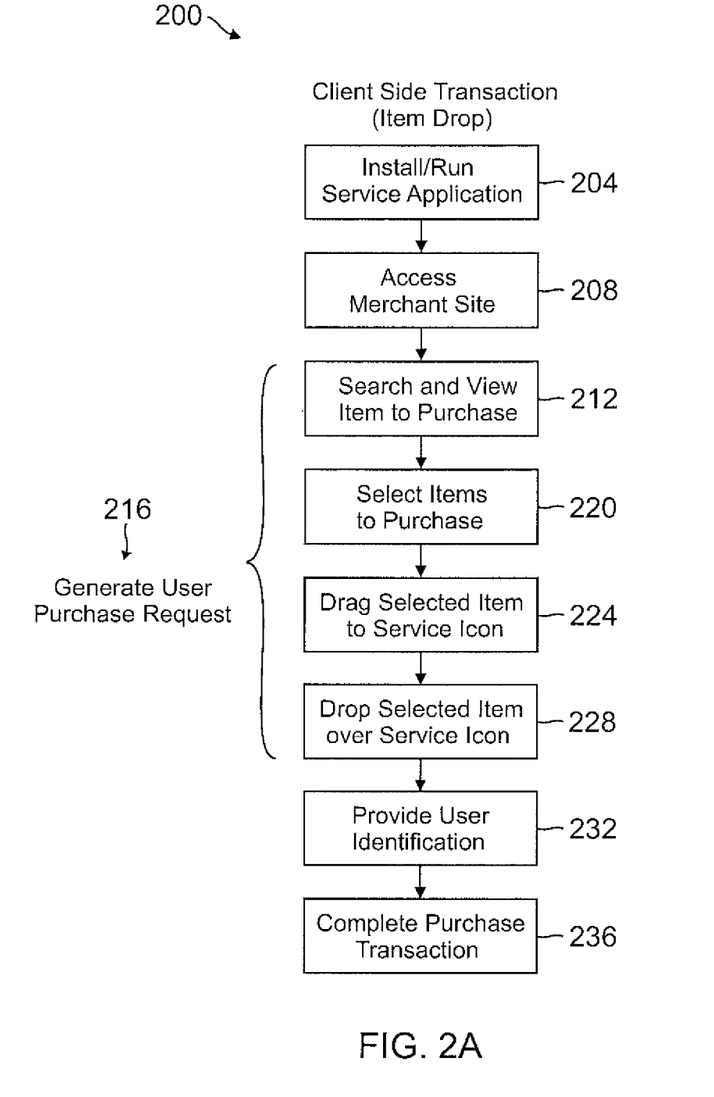
FIGS. 2A and 2B show various methods for facilitating a client-side online transaction with a service application in accordance with an embodiment of the invention.

FIG. 2A shows one embodiment of a method 200 for facilitating a client-side online transaction with the service application 126 in reference to the client device 120. As previously discussed, the service application 126 allows the client device 120 to communicate with one or more of the merchant servers 250 via the network 160 to select items for purchase and further communicate with the payment provider server 180 to process online purchase requests and/or transactions for items selected for purchase.

In one implementation, upon user instruction, the service application 126 may be installed and/or run on the client device 120 (block 204). The user 102 may run the browser application 122 on the client device 120 to access at least one merchant website via a related merchant server 140 (block 208) to search the accessed merchant website and view one or more items for purchase (block 212). In one embodiment, upon installation, the user 102 may be prompted to establish a user account with the payment provider server 180, wherein the user 102 may use the client device 120 to access the payment provider server 180 via the network 160. When establishing a user account, the user 102 may be asked to provide personal information, such as name, address, phone number, etc., and financial information, such as banking information, credit card information, etc. In one embodiment, information related to the user 102 may be packaged as the user identifier 130.

Next, the user 102 may generate a purchase request 216 for at least one item by selecting the at least one item (block 220), dragging the at least one item to the service icon (block 224), and dropping the at least one item over the service icon (block 228). In one embodiment, the user purchase request includes user information, merchant information, and selected item information embedded as arguments in an expression, which are passed to the payment provider server 180, in a manner as further discussed herein. The user information may include user identifier information, the merchant information may include the merchant identifier information, and the selected item information may include one or more image attributes, including item identifier information, having dynamic arguments identifying the item and merchant providing the item for purchase.

When enabled, the payment mechanism may transmit the image identifier along with the user identifier 130, the merchant identifier 148 and the item identifier to the payment provider server 180 for payment processing. When selecting an item to purchase, the user 102 may utilize a cursor control component (e.g., mouse) to select and drag an item icon or image, representing a selected item for purchase, from the merchant site to a service icon either on the desktop, in a toolbar, or in the browser. Once the user 102 drops the selected item over the service icon, the user 102 is prompted via, for example, a pop-up window, to provide input of user identification (block 232). However, it should be appreciated that the user identification may be provided as the user identifier 130 and passed with the user purchase request, and the payment provider server 180 may ask for verification of user identification from the user 102.

At this point, the user 102 may provide user identification 186 or at least verify the user identification for a related user account 184 stored in payment provider server 180 so that funds may be deducted from the user account 184 for purchase of the selected item. Once proper user identification is provided and/or verified, the online purchase transaction may be completed (block 236).

It should be appreciated by those skilled in the art that more than one item may be selected for purchase prior to completing the online purchase transaction. For example, a plurality of items may be selected and placed in a virtual shopping cart and then purchased in a single online purchase transaction. Alternately, each item selected for purchase may be purchased separately without departing from the scope of the present disclosure.

Figure 2B:
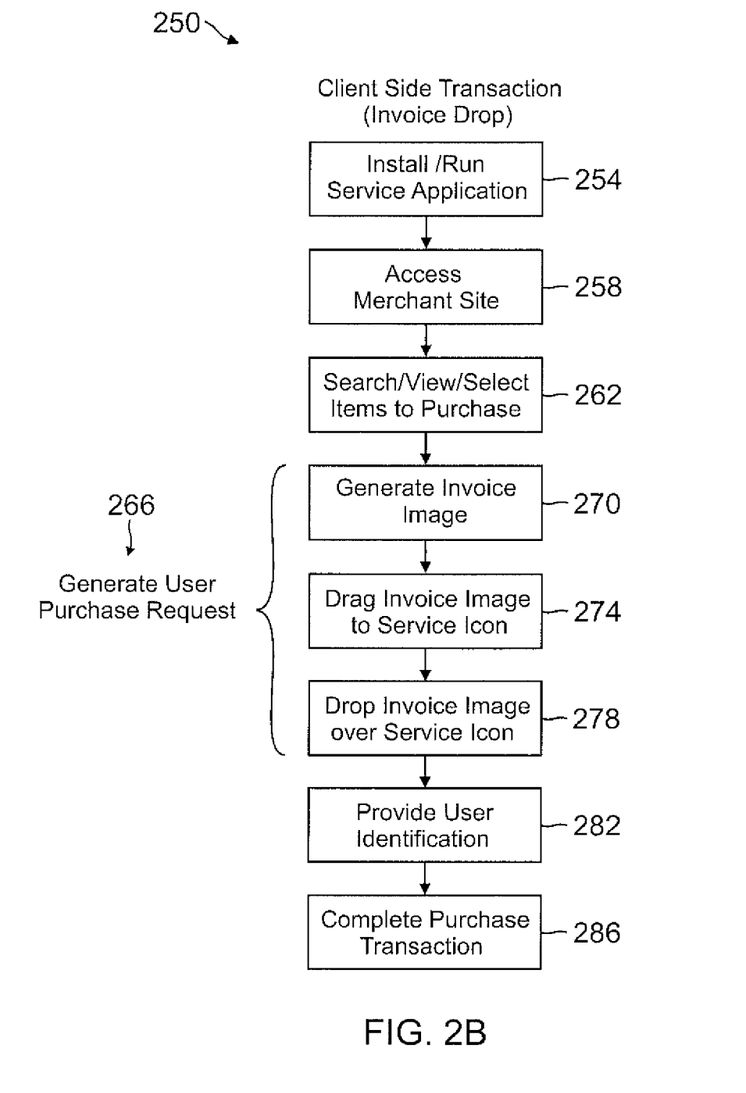

FIG. 2B shows one embodiment of a method 250 for facilitating a client-side online transaction with the service application 126 in reference to the client device 120. As will be discussed, the service application 126 allows the client device 120 to communicate with one or more of the merchant servers 250 via the network 160 to select items for purchase, generate an invoice image, and further communicate with the payment provider server 180 to process online purchase transactions for items selected for purchase.

In one implementation, upon user command, the service application 126 may be installed and/or run on the client device 120 (block 254). As previously discussed, upon installation, the user 102 may be prompted to establish a user account with the payment provider server 180. The user 102 may run the browser application 122 on the client device 120 to access at least one merchant website via a related merchant server 140 (block 258) to search, view, and select one or more items for purchase from the accessed merchant website (block 262). In one embodiment, more than one item may be selected and placed in a virtual shopping cart for purchase in a single online purchase transaction.

Next, the user 102 may generate a purchase request 216 for the one or more items selected for purchase by instructing the merchant server 140 to generate a invoice image or icon (block 270), dragging the invoice image or icon to the service icon (block 274), and dropping the invoice image or icon over the service icon (block 278). In one embodiment, the user purchase request includes user information, merchant information, and selected item information in the form of an invoice embedded as arguments in an expression, which are passed to the payment provider server 180, in a manner as further discussed herein. In various implementations, the image on the web page representing an item for purchase may include an image attribute having dynamic arguments that may be provided in the invoice or invoice. When enabled, the payment mechanism may transmit a bill or invoice identifier along with a user identifier and merchant identifier to the payment provider server for payment processing. When selecting one or more items for purchase, the user 102 may utilize a cursor control component (e.g., mouse) to select, drag and drop one or more item icons to the virtual shopping cart on the merchant site to create an item purchase list. The user 102 may then instruct the merchant server 140 to generate an invoice summarizing the items selected for purchase, wherein generating the invoice includes generating a invoice image or icon that represents the invoice and information related thereto, including item selection information, item availability information, purchase information, merchant identification information, etc.

After instructing the merchant site to generate the invoice image or icon to represent the selected items for purchase, the user 102 may select, drag and drop the invoice image from the merchant site to a service icon either on the desktop, in a toolbar, or in the browser. Once the user 102 drops the invoice image over the service icon, the user 102 is prompted via, for example, a pop-up window, to provide input of user identification (block 282). However, it should be appreciated that the user identification may be provided as the user identifier 130 and passed with the user purchase request, and the payment provider server 180 may ask for verification of user identification from the user 102.

In various implementations, the image of the invoice representing an item for purchase may include an image attribute having dynamic arguments identifying the merchant, the invoice and/or the one or more items selected for purchase. When enabled, the payment mechanism may transmit an invoice identifier along with a user identifier to the payment processing provider for payment processing of the purchase. The invoice identifier may include information relate to the selected items for purchase along with information related to the merchant including merchant information, such as merchant account information, needed for processing the purchase request.

Next, the user 102 may provide user identification 186 or at least verify the user identification for a related user account 184 stored in payment provider server 180 so that funds may be deducted from the user account 184 for purchase of the one or more selected items. Once proper user identification is provided and/or verified, the online purchase transaction may be completed (block 286).

Figure 3:
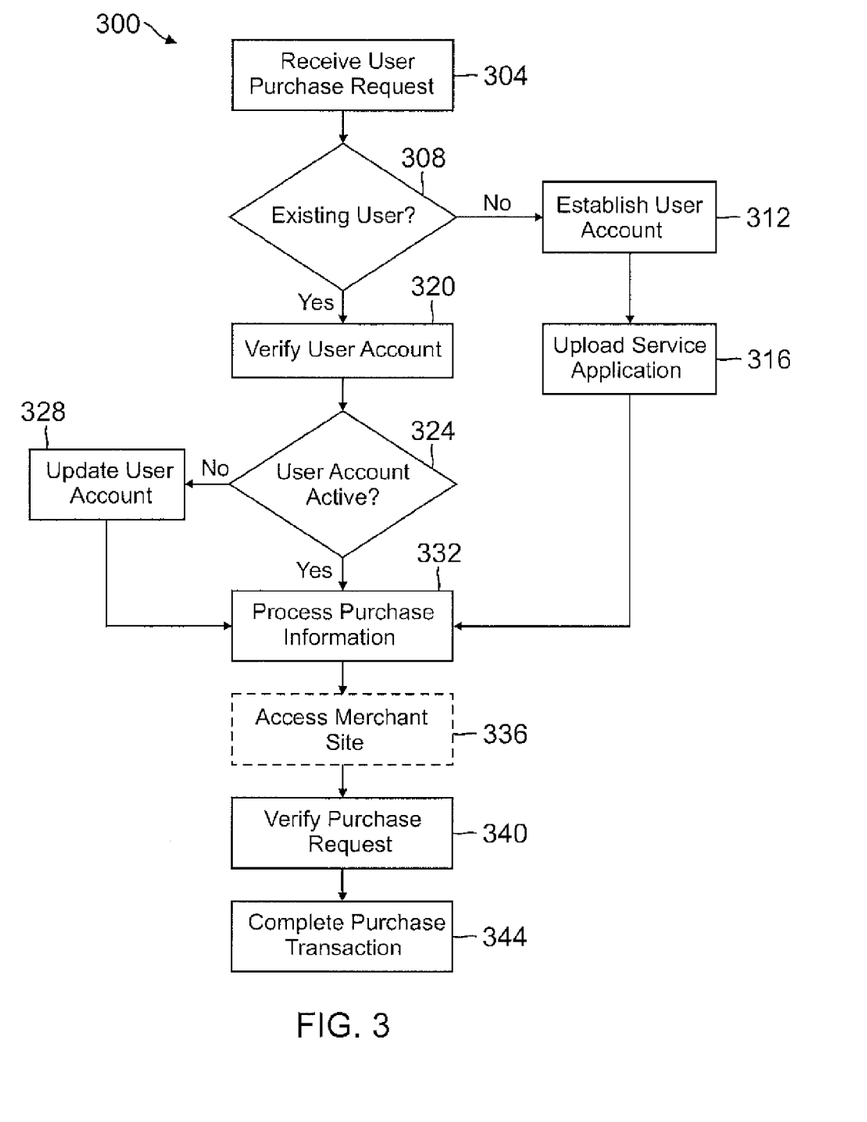
FIG. 3 shows a method for facilitating an online transaction in reference to a payment provider server in accordance with an embodiment of the invention.

FIG. 3 shows one embodiment of a method 300 for facilitating an online transaction in reference to the payment provider server 180.

In one implementation, the payment provider server 180 receives a purchase request from the user 102 via the client device 120 (block 304). As previously discussed in reference to FIGS. 2A and 2B, to initiate a user purchase request, the user 102 drags and drops an item icon of a selected item for purchase or an invoice image over the service icon, which initiates the user purchase request and online transaction with the payment provider server 180. In one embodiment, the user purchase request includes user information, merchant information, and selected item information embedded as arguments in an expression, which are passed to the payment provider server 180, in a manner as further discussed herein.

Upon receiving the user purchase request, the payment provider server 180 determines whether the user 102 is an existing user having an established user account 184 by, for example, checking a user account list in a user account database (block 308). If the user 102 does not have an established user account, then the payment provider server 180 prompts the user 102 to establish a user account 184 by providing user information 186 (block 312), and the payment provider server 180 uploads the service application 126 to the client device 120 so that the user 102 may install and run the service application 126 on client device 120 (block 316). Once the service application 126 is installed and run on the client device 120, the payment provider server 180 processes the purchase information provided in the user purchase request (block 332).

Otherwise, if the user 102 is determined to be an existing user by the payment provider server 180 (block 308), then the payment provider server 180 verifies the user account and user identification information provider by user 102 in the user purchase request (block 320). For example, as previously discussed, the user 102 may be prompted to provide user identification to purchase any selected items and complete the online transaction. Next, the payment provider server 180 may determine if the user account is current and active (block 324). In some instances, a user's account information may need to be updated, and thus, the payment provider server 180 may prompt the user 102 to update user account information 186 in the user account 184 for the user 102 (block 328). If the user account 184 is current and active, then the payment provider server 180 processes the purchase information in the user purchase request (block 332). It should be appreciated by those skilled in the art that the payment provider server 180 may cancel the online purchase transaction at any point in the process if it is determined that the user 102 enters wrong information or the user 102 is trying to purchase an item with criminal intent.

The payment provider server 180 processes the purchase information provided in the user purchase request (block 332). The purchase information may include information related to the item selected for purchase, information related to the merchant providing the item selected for purchase, information related to the user including user account number, balance information, credit card information, etc. In one implementation, the payment provider server 180 may optionally access the merchant site via the merchant server 140 to verify purchase information including verifying that the selected item is available (e.g., in stock), verifying the pricing information, verifying that the merchant account is up-to-date, etc. (block 336). Next, the payment provider server 180 may prompt the user 102 via, for example, a pop-up window, to verify the purchase request (block 340). For example, the payment provider server 180 may ask the user 102 to complete the purchase transaction by selecting a designated box to complete the purchase transaction. In this way, the payment provider server 180 is adapted to allow the user 102 to cancel the online payment transaction prior to completion.

Next, the payment provider server 180 completes the online purchase transaction by deducting the amount of the purchase request from the user account 184 and crediting the amount of the purchase request to the merchant account 184 (block 344). In one example implementation, completing the purchase request may include redirecting the user to a page on the merchant site that confirms their purchase of the selected product to provide, for example, a receipt to the user. The payment mechanism may also take different actions, such as adding the product to a virtual shopping cart and providing buttons to complete the purchase at a later time.

Figure 4:
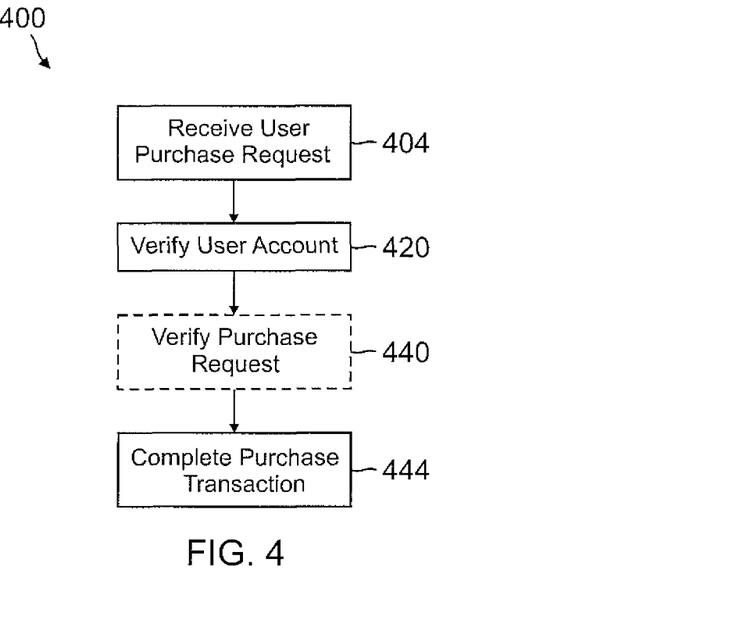
FIG. 4 shows a streamlined method for facilitating an online transaction in reference to the payment provider server in accordance with an embodiment of the invention.

FIG. 4 shows one embodiment of a method 400 for facilitating an online transaction in reference to the payment provider server 180. In one implementation, method 400 of FIG. 4 is a streamlined version of the method 300 of FIG. 3, wherein like functions and/or actions may be interchanged without departing from the scope of the present disclosure.

In one implementation, the payment provider server 180 receives a purchase request from the user 102 via the client device 120 (block 404). As previously discussed, the user 102 may initiate a user purchase request by dragging and dropping an item icon of a selected item for purchase over the service icon, which initiates the user purchase request and online transaction with the payment provider server 180.

Next, upon receiving the user purchase request, the payment provider server 180 verifies the user account information including user identification provider by user 102 in the user purchase request (block 420). For example, as previously discussed, the user 102 may be prompted by the payment provider server 180 to provide user identification to purchase any selected items and complete the online transaction.

Next, the payment provider server 180 may prompt the user 102 via, for example, a pop-up window, to verify the purchase request (block 440). For example, as previously discussed, the payment provider server 180 may ask the user 102 to complete the purchase transaction by selecting a designated box to complete the purchase transaction. Next, the payment provider server 180 completes the online purchase transaction by deducting the amount of the purchase request from the user account 184 and crediting the amount of the purchase request to the merchant account 184 (block 444).

Figure 5A:
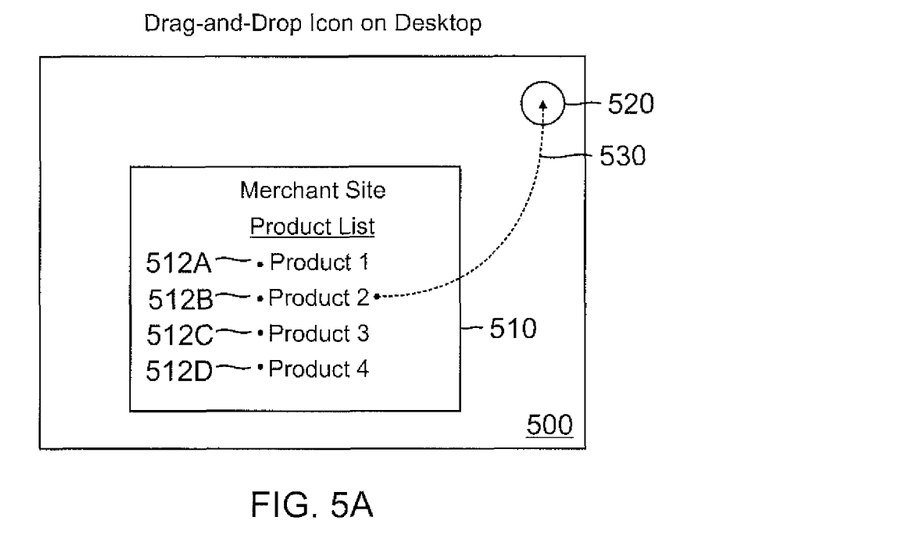
FIGS. 5A-5C show service and item icons in various desktop display configurations in accordance with various embodiments of the invention.
Figure 5B:
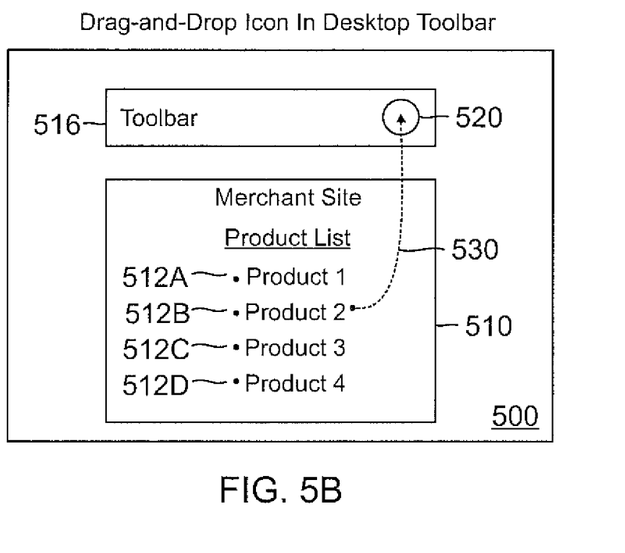
Figure 5C:
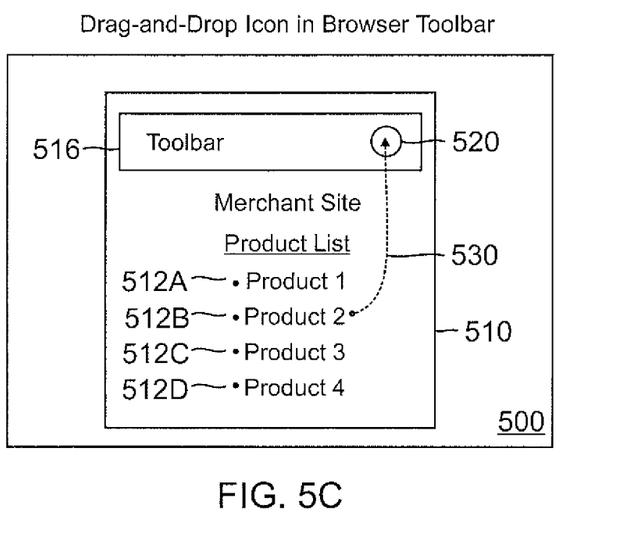

FIGS. 5A-5C shows various embodiments of a service icon and item icons. In particular, FIG. 5A shows an image of a computer desktop 500 displaying a service icon 520 and a browser window 510 with item icons 512A-512D therein, FIG. 5B shows an image of the computer desktop 500 displaying a toolbar window 516 with the service icon 520 therein and the browser window 510 with the item icons 512A-5412D therein, and FIG. 5C shows an image of the computer desktop 500 displaying the browser window 510 with the item icons 512A-512D and the toolbar 516 with the service icon 520 therein.

Referring to FIG. 5A, a display component of the client device 120 is adapted to display the service icon 520 and the browser window 510 in the computer desktop 500 with the item icons 512A-512D in the browser window 510. In one embodiment, as shown in FIG. 5A, the user 102 utilizes the browser application 122 to open the browser window 510 and access a merchant server 140 via a merchant site to view a product list having one or more items for purchase including items 512A-512D. When executed, the service application 126 is adapted to provide the service icon 520 on the desktop 500 so that the user 102 may select and drag 530 an item icon for purchase, such as item icon 512B, and drop the item icon over the service icon 520 to initiate a purchase request with the merchant server 140 and the payment provider server 180, in a manner as previously discussed.

Referring to FIG. 5B, a display component of the client device 120 is adapted to display the service icon 520 in a toolbar 516 and the browser window 510 in the computer desktop 500 with the item icons 512A-512D in the browser window 510. In one embodiment, as shown in FIG. 5B, the user 102 utilizes the toolbar application 124 to open the toolbar 516 with the service icon 520 therein. Also, the user 102 utilizes the browser application 122 to open the browser window 510 and access a merchant server 140 via a merchant site to view a product list having one or more items for purchase including items 512A-512D. When executed, the service application 126 is adapted to provide the service icon 520 in the toolbar 516 so that the user 102 may select and drag 530 an item icon for purchase, such as item icon 512B, and drop the item icon over the service icon 520 in the toolbar 516 to initiate a purchase request with the merchant server 140 and the payment provider server 180, in a manner as previously discussed.

Referring to FIG. 5C, a display component of the client device 120 is adapted to display the service icon 520 in the toolbar 516 and the browser window 510 in the computer desktop 500 with the toolbar 516, service icon 520, and item icons 512A-512D in the browser window 510. In one embodiment, as shown in FIG. 5C, the user 102 utilizes the browser application 122 to open the browser window 510 and access a merchant server 140 via a merchant site to view a product list having one or more items for purchase including items 512A-512D. Also, the user 102 utilizes the toolbar application 124 to open the toolbar 516 in the browser window 510 with the service icon 520 therein. When executed, the service application 126 is adapted to provide the service icon 520 in the toolbar 516 and in the browser window 510 so that the user 102 may select and drag 530 an item icon for purchase, such as item icon 512B, and drop the item icon over the service icon 520 in the toolbar 516 to initiate a purchase request with the merchant server 140 and the payment provider server 180, in a manner as previously discussed. In various implementations, the user purchase request includes user information, merchant information, and selected item information embedded as arguments in an expression, which are passed to the payment provider server 180 during generation of the user purchase request.

Figure 5D:
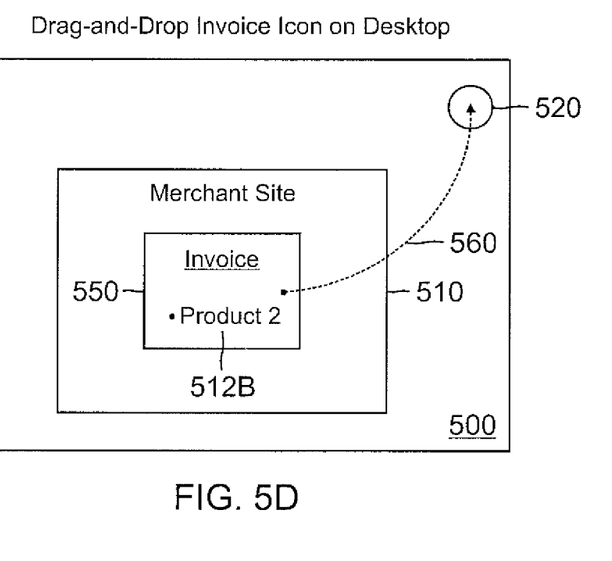
FIGS. 5D-5F show service and invoice images in various desktop display configurations in accordance with various embodiments of the invention.
Figure 5E:
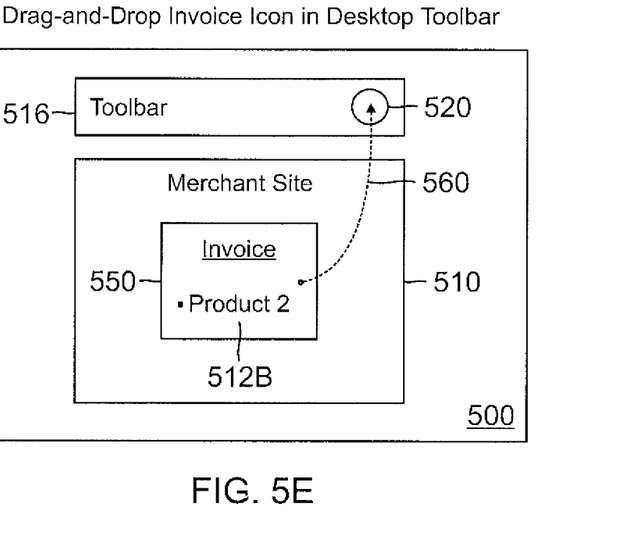
Figure 5F:
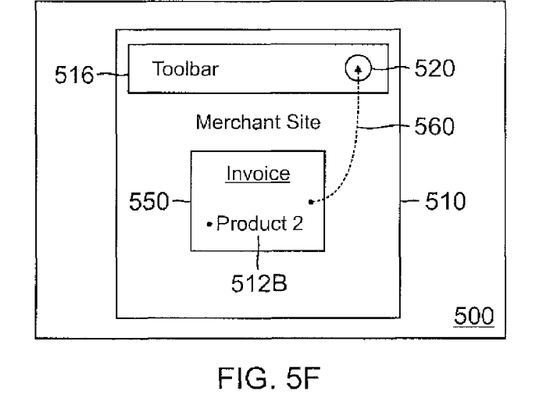

FIGS. 5D-5F shows various embodiments of a service icon and an invoice image. In particular, FIG. 5D shows an image of the computer desktop 500 displaying the service icon 520 and the browser window 510 with a invoice image 550 showing the purchase of item 512B therein, FIG. 5E shows an image of the computer desktop 500 displaying the toolbar window 516 with the service icon 520 therein and the browser window 510 with the invoice image 550 showing the purchase of item 512B therein, and FIG. 5F shows an image of the computer desktop 500 displaying the browser window 510 with the invoice image 550 and the toolbar 516 with the service icon 520 therein.

Referring to FIGS. 5D-5F, a display component of the client device 120 is adapted to display the service icon 520 and the browser window 510 in the computer desktop 500 with the bill image or icon 550 in the browser window 510. As previously discussed, the user 102 utilizes the browser application 122 to open the browser window 510 and access a merchant server 140 via a merchant site to view a product list having one or more items for purchase including items 512A-512D. Once items are selected for purchase, the user 102 instructs the merchant server 140 to generate a bill image or icon 550 that represents a purchase list of the items selected for purchase. The bill image or icon 550 includes information related to the selected items for purchase along with information related to the merchant including merchant account information needed for processing the purchase request.

In one embodiment, as shown in FIG. 5D, the service application 126 is adapted to provide the service icon 520 on the desktop 500 so that the user 102 may select and drag 560 the invoice image 550 to the service icon 520 and drop the invoice image 550 over the service icon 520 to initiate a purchase request with the merchant server 140 and the payment provider server 180, in a manner as previously discussed.

In another embodiment, as shown in FIG. 5E, the service application 126 is adapted to provide the service icon 520 in the toolbar 516 so that the user 102 may select and drag 530 the invoice image 550 to the service icon 520 and drop the invoice image 550 over the service icon 520 in the toolbar 516 to initiate a purchase request with the merchant server 140 and the payment provider server 180, in a manner as previously discussed.

In still another embodiment, as shown in FIG. 5F, the service application 126 is adapted to provide the service icon 520 in the toolbar 516 and in the browser window 510 so that the user 102 may select and drag 530 the bill image or icon 550 to the service icon 520 and drop the bill image or icon 550 over the service icon 520 in the toolbar 516 to initiate a purchase request with the merchant server 140 and the payment provider server 180, in a manner as previously discussed. In various implementations, the user purchase request includes user information, merchant information, and billing information related to the selected item information embedded as arguments in an expression, which are passed to the payment provider server 180 during generation of the user purchase request.

Figure 6:
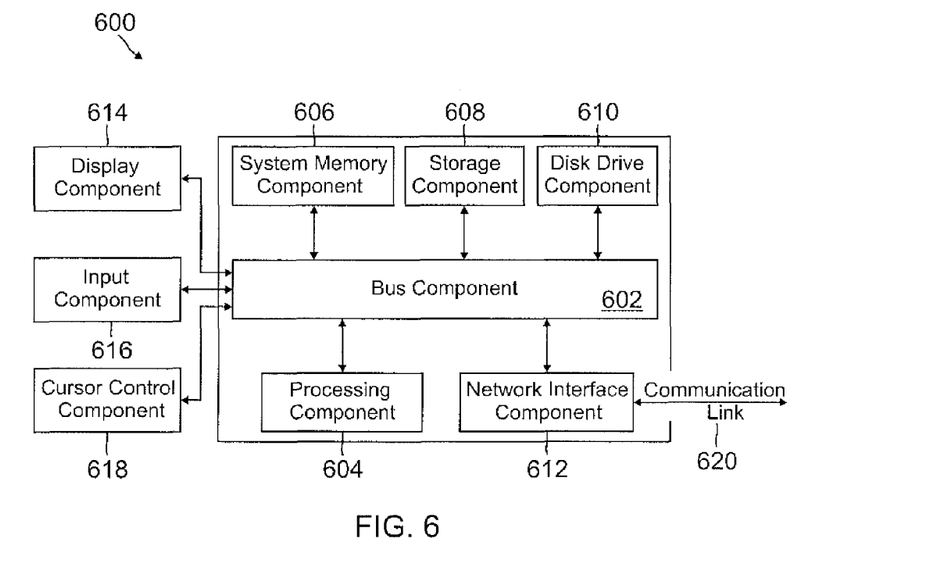
FIG. 6 is a block diagram of a computer system suitable for implementing embodiments of the invention.

FIG. 6 is a block diagram of a computer system 600 suitable for implementing embodiments of the invention, including the client device 120, the one or more merchant devices 140, and the payment processing device 180. In various implementations, the client device 140 may comprise a personal computing device, such as a personal computer, laptop, PDA, etc., the one or more merchant devices 140 may comprise a network computing device, such as a server, and the payment processing device may comprise a network computing device, such as a server. Thus, it should be appreciated that the devices 120, 140, 180 may be implemented as computer system 600 in a manner as follows.

In accordance with various embodiments of the invention, computer system 600, such as a personal computer and/or a network server, includes a bus 602 or other communication mechanism for communicating information, which interconnects subsystems and components, such as processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard), and cursor control component 618 (e.g., mouse or trackball). In one implementation, disk drive component 610 may comprise a database having one or more disk drive components.

In accordance with embodiments of the invention, computer system 600 performs specific operations by processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of or in combination with software instructions to implement the invention.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the invention, execution of instruction sequences to practice the invention may be performed by computer system 600. In various other embodiments of the invention, a plurality of computer systems 600 coupled by communication link 620 (e.g., network 160 of FIG. 1, LAN, WLAN, PTSN, or various other wired or wireless networks) may perform instruction sequences to practice the invention in coordination with one another.

Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed, It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus, the invention is limited only by the claims.

What is claimed is:

1. A system for facilitating financial transactions over a network, the system comprising:
   a communication component of a payment provider communicating with a user via a client device over the network and a merchant via a merchant device over a network;
   a hardware processing component of the payment provider comprising a computer processor receiving an image that represents an invoice corresponding to an invoice bill, determining a payment method for the invoice bill, and notifying the merchant that the financial transaction is complete, wherein the payment provider is a separate entity from the merchant and the user and provides online payment services for the user, and
   a storage component storing a plurality of accounts including a user account related to the user and a merchant account related to the merchant, wherein the user account includes user information related to the user and the merchant account includes merchant information related to the merchant, and wherein at least some of the user information and merchant information are passed with the purchase request;
   wherein the hardware processing component verifies the user information including accessing the user account based on the user information passed with the purchase request, and verifies the merchant information including accessing the merchant account based on the merchant information passed with the image or the purchase request;
   wherein the payment provider generates the image after the merchant generates the invoice bill for the selected list of the at least one item and processes the financial transaction when the user drags-and-drops the image to a service icon installed on or in the user device, and
   wherein the payment provider automatically transmits an invoice identifier identifying the invoice bill along with a user identifier identifying the user and a merchant identifier identifying the merchant to the processing component for automatic processing of the financial transaction without the user having to provide user account information with the payment provider directly to the merchant.

2. The system of claim 1, wherein the merchant device provides one or more items for purchase via the network in the form of self-contained invoice.

3. The system of claim 1, wherein the client device includes a browser application for accessing the merchant device via the network and viewing the one or more items for purchase.

4. The system of claim 1, wherein the service icon comprises at least one of a desktop icon, a toolbar icon and a browser icon displayed on a display component of the client device.

5. The system of claim 1, wherein the processing component processes the purchase request by deducting monetary funds from the user account.

6. The system of claim 1, wherein the processing component processes the purchase request by crediting the monetary funds to the merchant account.

7. The system of claim 1, wherein information passed with the purchase request includes information related to the at least one item selected for purchase.

8. The system of claim 1, wherein the merchant device comprises a server communicating with the client device and the processing component via the network, and wherein the merchant device communicates with the processing component to receive notification that the user paid for the invoice bill corresponding to the image via the network.

9. The system of claim 1, wherein the system comprises a server communicating with the client device and the merchant device via the network.

10. The system of claim 1, wherein the processing component provides a service application to the client device.

11. The system of claim 1, wherein the client device comprises a computer communicating with the merchant device and the processing component via the network.

12. A system for facilitating financial transactions over a network, the system comprising:
- a communication component of a payment provider comprising a computer processor communicating with a user via a client device over the network and a merchant via a merchant device over a network, the merchant device providing one or more items for purchase via the network and generating an image that represents an invoice corresponding to an invoice bill for at least one item selected for purchase by the user;
- a hardware processing component of the payment provider receiving the image and authorizing the user to purchase the at least one item selected for purchase from the merchant based on information passed with the image, wherein the payment provider is a separate entity from the merchant and the user and provides online payment services for the user; and
- a storage component storing a plurality of accounts including a user account related to the user and a merchant account related to the merchant, wherein the user account includes user information related to the user and the merchant account includes merchant information related to the merchant, and wherein at least a portion of the user information and merchant information are passed with the purchase request,
- wherein the hardware processing component verifies the user information including accessing the user account based on the user information passed with purchase request for the at least one item selected for purchase, and verifies the merchant information including accessing the merchant account based on the merchant information passed with the image or the purchase request,
- wherein the payment provider processes the financial transaction after the user selects the at least one item for purchase, communicates to the merchant device to generate the image of the at least one item selected for purchase, drags the merchant generated image to a service icon installed on or in the user device, and drops the merchant generated image into or over the service icon, and
- wherein the payment provider automatically transmits an invoice identifier identifying the invoice bill along with a user identifier identifying the user and a merchant identifier identifying the merchant to the processing component for automatic processing of the purchase request without the user having to provide user account information with the payment provider directly to the merchant.

13. The system of claim 12, wherein the client device includes a browser application accessing the merchant device via the network and viewing the one or more items for purchase.

14. The system of claim 12, wherein the image comprises embedded information related to the purchase including at least one of item selection information, item availability information, purchase information, and merchant identification information.

15. The system of claim 12, wherein the image comprises an image displayed by the browser application on the client device.

16. The system of claim 12, wherein the at least one item selected for purchase are listed by the merchant device in a virtual shopping cart, and wherein the image is generated based on information related to the virtual shopping cart.

17. A method for facilitating financial transactions over a network, the method comprising:
- at a server of a payment provider, providing a payment icon on the client device as a purchase mechanism to the user via the client device operated by the user;
- at a server of the payment provider, communicating with the user via the client device over the network and a merchant via a merchant device over the network to process a financial transaction between the user and the merchant, wherein the payment provider is a separate entity from the merchant and the user and provides online payment services for the user;
- at a server of the payment provider, receiving an image that represents an invoice and an invoice identifier identifying the invoice bill along with a user identifier identifying the user and a merchant identifier identifying the merchant, the image corresponding to an invoice bill generated by the merchant for an item selected for purchase by the user, the image being received from the client device by the user dragging-and-dropping the image into or over the payment icon displayed on the client device, the image including user information, merchant information, and selected item information;
- at a server of the payment provider, maintaining a plurality of accounts including a user account and a merchant account, wherein the user account includes financial information related to the user and the merchant account includes financial information related to the merchant;
- at a server of the payment provider, verifying the user information including accessing the user account based on the user information;
- at a server of the payment provider, verifying the merchant information including accessing the merchant account based on the merchant information;
- at a server of the payment provider, automatically processing the financial transaction by accessing the invoice bill corresponding to the image and authorizing the user to purchase the selected item from the merchant based on the verified user and merchant information, and
- at a server of the payment provider, completing the financial transaction by deducting monetary funds from the user account and crediting funds to the merchant account without the user having to provide user account information with the payment provider directly to the merchant.

18. The method of claim 17, wherein the service application comprises a computer program executable by a processor on the client device.

19. The method of claim 17, wherein the purchase mechanism comprises an image.

\* \* \* \* \*